UNITED STATES PATENT OFFICE.

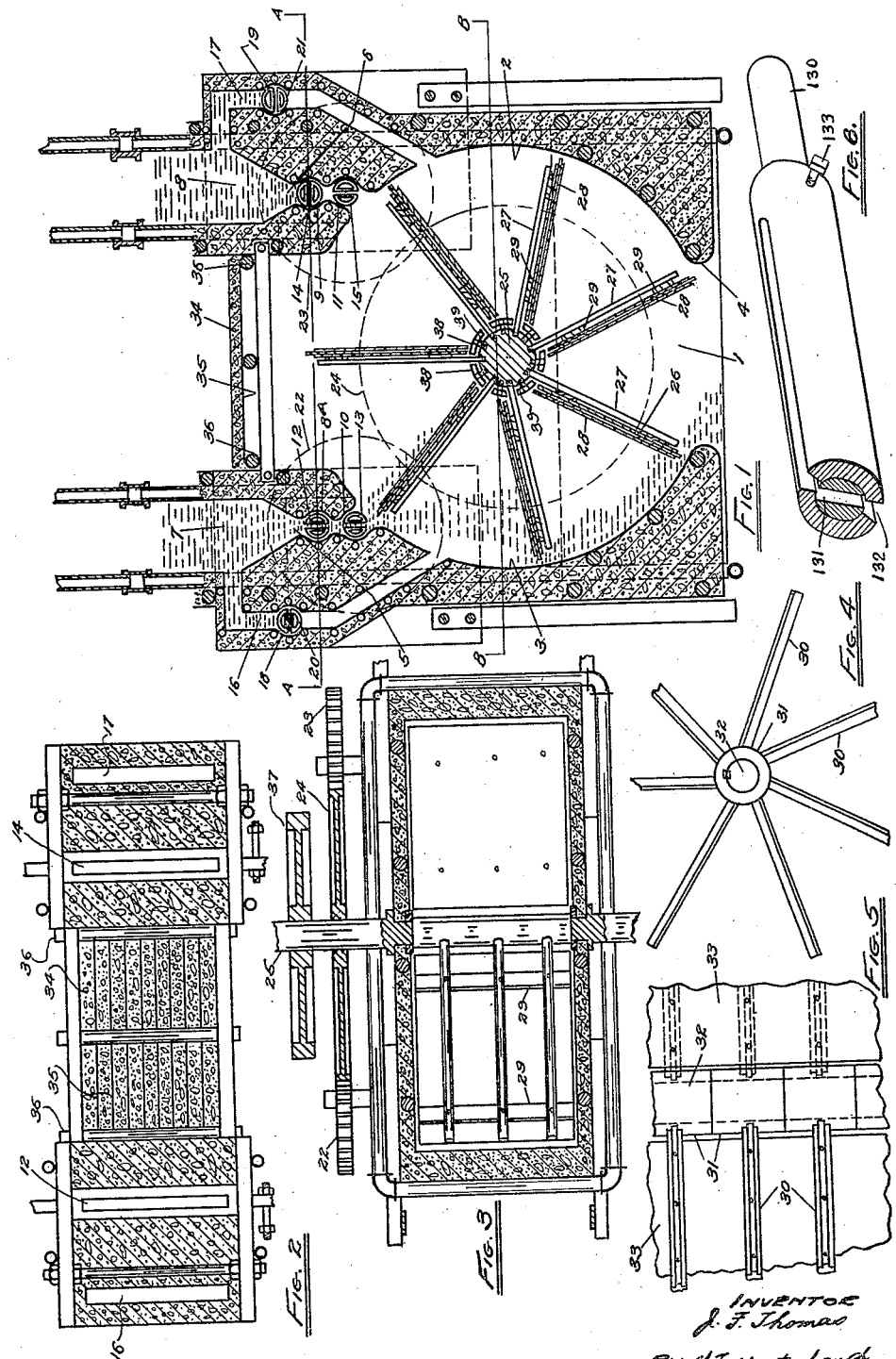

JAMES FRANCIS THOMAS, OF MONTREAL, QUEBEC, CANADA.

ROTARY POWER MACHINE.

1,402,113. Specification of Letters Patent. Patented Jan. 3, 1922.

Application filed September 3, 1918. Serial No. 252,485.

*To all whom it may concern:*

Be it known that I, JAMES FRANCIS THOMAS, a subject of the King of Great Britain, and resident of 23 Overdale Avenue, in the city and District of Montreal, in the Province of Quebec, in the Dominion of Canada, have invented certain new and useful Improvements in Rotary Power Machines, of which the following is the specification.

The invention relates to rotary power machines as described in the present specification and illustrated in the accompanying drawings that form part of the same.

The invention consists essentially of the novel means employed, whereby the water or other fluid is brought into a channel and directed by converging walls to an advance valve and from there to an adjustable valve through which it flows to a power wheel.

The objects of the invention are to conserve the energy of the flowing water or other fluid by limiting the flow and thus avoid wastage of power incident to freeing great volumes of water on a water wheel; to devise a simple form of power pump or engine, in which both the installation and maintenance charges will be comparatively light; to lessen the price per H. P. in heavy service machines; and generally to provide an economical, durable and efficient engine.

In the drawings, Figure 1 is a vertical sectional view of the plant.

Figure 2 is a horizontal sectional view of the complete machine on the line A—A in Figure 1.

Figure 3 is a horizontal sectional view on the line B—B in Figure 1.

Figure 4 is a fragmentary view of another form or vane braces or spokes.

Figure 5 is a fragmentary view showing the braces illustrated in Figure 4 in their relation to vane and shaft.

Figure 6 is a sectional perspective detail of valve and stem.

Like numerals of reference indicate corresponding parts in the several figures.

Referring to the drawings, the fluid chamber 1 is here shown as enclosed by the walls 2 and 3, which are preferably of plastic material, the outlet 4 being at the lower end and the optional inlets 5 and 6 at the upper ends, one at each side. Each of the inlets converge from the races 7 and 8 to the valve chambers 8ᴬ, 9, 10, and 11, in which the rotary valves 12, 13, 14 and 15 operate, the valves 12 and 14 being the advance valves and the valves 13 and 15 being adjustable valves controlling the quantity of water fed into the chamber 1.

The auxiliary passages 16 and 17 are to the outside of the passages 5 and 6 respectively and intermediate of their length have the valve chambers 18 and 19, in which the valves 20 and 21 rotate.

These valves 20 and 21 are normally closed but in case of a dead center in the operation of the valves 13 and 15 the machine may be started by opening the valves 20 and 21 until the operation has begun.

The stems of the valves 13 and 15 carry the gear wheels 22 and 23, and these gears turn the stems on which the said valves are mounted, so that when the ports in said valves are opened for the passage of the water, the size of the actual port may be reduced by the position of the stem in relation to the valve adjustably mounted on said stem and held by set screw or other means.

The valves 13 and 15 are mounted on the stems 130, each stem having a longitudinal slot 131 as an inlet port and each of the valves 13 and 15 having a longitudinal slot 132 adapted to register with the slot 131 and to form the entrance for the water. The said valves 13 and 15 are held on their stems 130 by the set screws 133 in the desired position so as to adjust the valve and regulate thereby the size of the entrance port.

The gears 22 and 23 are operated by the gear 24 on the main shaft 25, which is journaled in suitable bearings secured in the walls of the chamber 1.

The rotor 26 is mounted on the shaft 25 within the chamber 1 and is formed of the radial braces or spokes 27, preferably formed of tubing threaded into the shaft 25, and the blades 28 adjustably secured to the brace tubes 27, by means of the clamping blocks 29 and suitable bolts or screws, which enables the blades to be moved into proximity of the plastic wall.

Another form of rotor is shown in Figures 4 and 5, in which the ribbed braces 30 are cast into the sectional hubs 31, which are fixedly mounted on the shaft 32 and carry the blades 33.

The advantage of the plastic material is that the fluid chamber and valve chambers may be trued by the rotor and valves before becoming set, thereby assuring a good fit without packing, though it must be understood packing may be used. The upper end of the fluid chamber is preferably closed in by a man hole cover 34, which is also formed of the plastic material which is reinforced like the main walls as customary in such work.

The cover 34 rests on the removable rods 35, which are supported by the fixed side bars 36 thus both cover 34 and rods 35 may be removed to reach the interior of the chamber 1 for repairs and replacements.

A plurality of spacers 38 are secured to the shaft 25 between the blades by the screws 39 and reinforce the blades against the weight of water and in operation form a stop in each case to ease the fastening to the shaft.

In the operation of this machine, the water is directed into one or other of the races 7 and 8, say for example into the race 7.

The race 7 leads to the inlet 5 which converges to the advance valve chamber 8. The valve 12 is operated through its stem by a suitable handle or wheel and thus becomes the throttle.

The opening of the valve 12 admits the water to the passage between the valves 12 and 13 and assuming that the latter is open, the water flows into the chamber 1, where it falls on one or more of the blades of the rotor. The rotor begins to revolve and the fly wheel 37 mounted on the main shaft 25 also rotates, which assists in carrying the valve 13 to its next open position and then the next fall of water occurs thereby continuing the operation until the maximum speed of the engine is reached.

The valve 13 is operated by the main gear 24 coacting with gear 22, so that water is admitted periodically.

The rotor where the fly wheel is of great size cannot readily be turned to start the engine, can be actuated by the auxiliary passage controlled by the valve 20, which is opened just for the period of the initial movement.

The intermittent operation in this machine is of advantage in conserving water, where the supply is to some extent limited.

Various changes may be made in regard to structural features and fluid employed without departing from the spirit of the invention and so long as they are within the scope of the claim for novelty following the protection shall not be invalidated.

What I claim is:—

In a rotary power machine, the combination with separate mill races leading to inlet passages of a fluid chamber having shaft bearings and main and auxiliary inlets and an outlet, outer and inner valves introduced in each of said main inlets and a valve in each auxiliary inlet, gears mounted on the stems of said inner outlet valves, driving gears coacting therewith, said valves being adjustably mounted on said stems to vary the size of the inlet port, and a rotor journaled in said fluid chamber and radial blades and spacers between the ends of said blades.

Signed at the city of Montreal, Quebec, Canada, this 30th day of August, 1918.

JAMES FRANCIS THOMAS.